W. BLOOMBERG.
DRINKING GLASS HOLDER.
APPLICATION FILED APR. 21, 1916.
1,236,254.
Patented Aug. 7, 1917.
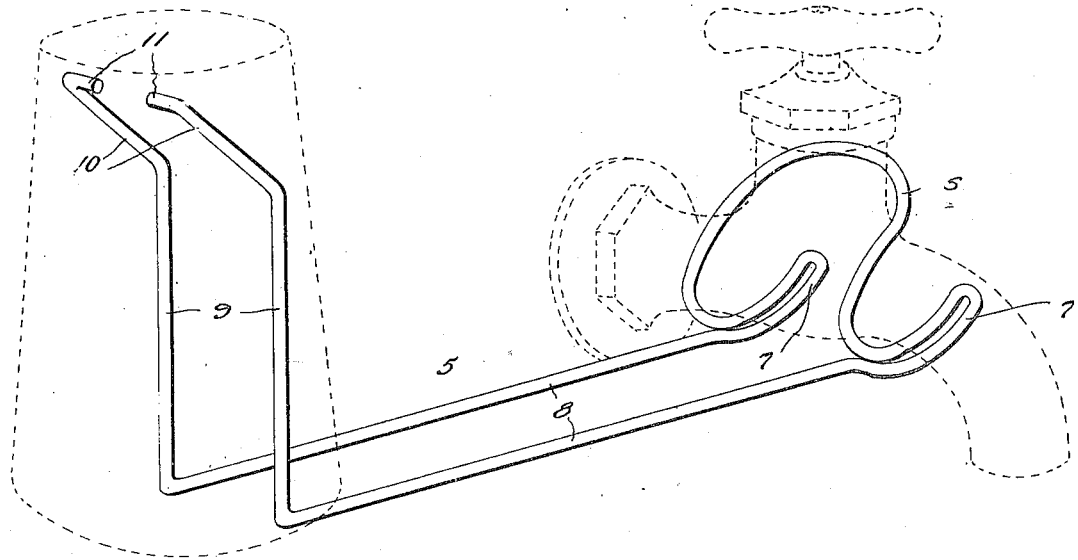
Fig. 1.
Fig. 2.
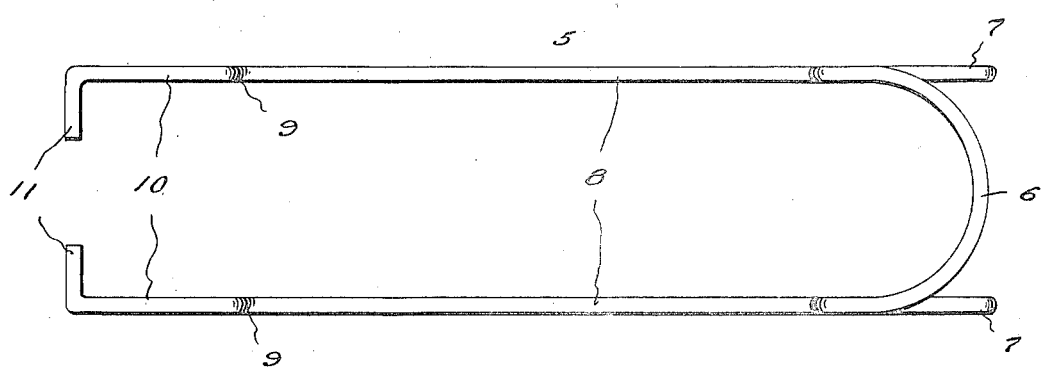
Inventor
Wm. Bloomberg.
Witness
Paul N. Hart.
N. G. Minnett
By David Moore.
Attorney

UNITED STATES PATENT OFFICE.

WILLIAM BLOOMBERG, OF PASSAIC PARK, NEW JERSEY.

DRINKING-GLASS HOLDER.

1,236,254.

Specification of Letters Patent.   Patented Aug. 7, 1917.

Application filed April 21, 1916.   Serial No. 92,777.

*To all whom it may concern:*

Be it known that I, WILLIAM BLOOMBERG, a citizen of the United States, residing at Passaic Park, in the county of Passaic and State of New Jersey, have invented certain new and useful Improvements in Drinking-Glass Holders, of which the following is a specification.

The present invention relates to improvements in drinking glass holders, one object of the invention being the provision of a holder for attachment to a faucet and provided with means for fitting any usual form of glass so that such glass may be held inverted when put in use.

A further object of this invention is the provision of a wire holder that is readily attached to and detached from a faucet.

A still further object of this invention is the provision of a simple, durable and cheap form of holder which is therefore thoroughly efficient and practical in use.

In the accompanying drawings:—

Figure 1 is a perspective view of the holder, dotted lines showing the faucet and the glass in place.

Fig. 2 is an enlarged view of the device *per se.*

Referring to the drawings, the numeral 5 designates the holder which is made from a single strand of wire and bent to provide the faucet embracing loop 6, the two reverse bends 7, and the straight rods 8. The terminals of the rods are each provided with the right-angled portion 9, and with the inclined portion 10, which is provided with the inwardly projecting hook 11.

In use, assuming that the holder is attached to the faucet, indicated in dotted lines in Fig. 1, a glass as indicated in dotted lines in Fig. 1 is adapted to be supported at an incline on the straight portions 8, the closed end being arranged in the right angled portions 9 which coöperate with the bracing loop 6 for limiting the projection of the glass on the portions or rods 8.

It will be understood that the above description and accompanying drawings comprehend only the general and preferred embodiment of my invention and that various minor changes in detail of construction, proportion and arrangement of the parts may be made within the scope of the appended claims.

What I claim as new is:—

1. A drinking glass holder made from a single strand of wire and having faucet embracing portions, two resilient glass supporting portions at the opposite ends, and two straight parallel portions, whereby the inverted glass is supported from its bottom and held from sliding movement.

2. A drinking glass holder made from a single strand of wire, and including two parallel rods having formed at right angles to each a glass receiving hook, and an upstanding faucet embracing loop joining the other ends of the rods and having an outwardly curved portion to fit about the stem casing of the faucet.

3. A drinking glass holder made from a single strand of wire bent to provide two spaced and parallel rods, each terminating in a right-angled end terminating in an inclined hook, the juncture of the two rods being two reverse curved portions terminating in a faucet embracing loop.

In testimony whereof I affix my signature.

WILLIAM BLOOMBERG.